United States Patent [19]

Green

[11] Patent Number: 4,908,613

[45] Date of Patent: Mar. 13, 1990

[54] DISPLAY DEVICE

[75] Inventor: Ian M. Green, Buckie, Scotland

[73] Assignee: Thorn EMI plc, London, England

[21] Appl. No.: 98,169

[22] Filed: Sep. 18, 1987

[30] Foreign Application Priority Data

Sep. 20, 1986 [GB] United Kingdom ............... 8622714

[51] Int. Cl.[4] .............................................. G09G 3/02
[52] U.S. Cl. .................................... 340/719; 340/793
[58] Field of Search ............... 340/718, 719, 765, 767,
340/771, 773, 776, 777, 784, 793; 350/330, 331
R, 332, 333

[56] References Cited

U.S. PATENT DOCUMENTS 4,427,978  1/1984  Williams .............................. 340/784
4,649,432  3/1987  Watanabe et al. ................... 340/793

FOREIGN PATENT DOCUMENTS 0151508  8/1985  European Pat. Off. .
2047453  11/1980  United Kingdom .

Primary Examiner—Gerald Brigance
Assistant Examiner—Richard Hjerpe
Attorney, Agent, or Firm—Fleit, Jacobson, Cohn, Price, Holman & Stern

[57] ABSTRACT

A liquid crystal display has a matrix of pixels each with a continuously clocked counter used both as the data store and as the mechanism of grey scale generation. The grey level of each pixel is stored as the phase of the counter with respect to a reference count.

The data bus, load clock, counter clock and master phase reference are all lines which transport signals common to a large number of pixels.

The shift data line is used to propagate a bit which enables the counter load input. Each pixel circuit instructs the adjacent circuit that it is next to be loaded, by use of a clock delay. Thus pixels are loaded in sequence from data on the load bus, that data being between load clock pulses. The bistable circuit element, set from the master timing and reset from the counter, has an output which directly drives a bistable liquid crystal display device.

13 Claims, 4 Drawing Sheets

DISPLAY DEVICE

BACKGROUND OF THE INVENTION

The present invention relates to a display device, and especially, but not solely, to a grey-scale television display using bistable elements, for example made from ferroelectric liquid-crystal material.

British Patent Specification Publication No. 2047453A discloses a L.E.D. or gas discharge matrix addressed by rows, the columns being driven by amplitude and duration-modulated current. For each column a counter is loaded with a number representing the required brightness and counted down to zero. Each counter stage operates a gate which controls a weighted current.

SUMMARY OF THE INVENTION

The present invention provides a display device comprising:
  a lattice of pixels;
  each pixel having a counter operable for continuous counting; and
  means to operate one or more counters to effect actuation of each pixel for a time duration within each picture in accordance with the value of the picture-signal for that pixel.

Preferably a pixel is actuated for a time period corresponding to the interval between the reception, at the pixel, of a specified characteristic (e.g. a change of bit state) in the picture-signal and the occurrence of that specified characteristic in a reference signal.

Thus, preferably, a counter has means to monitor for the presence of a specified characteristic in an input signal, and means to set the associated pixels to a state upon detection of the specified characteristic. Preferably, the display device has means to input a signal to pixels in order to set each said pixel to a state.

Another aspect of the present invention provides a method of operating a display device comprising a lattice of pixels, each having a counter operable for continuous counting, the method comprising operating counters to effect actuation of each pixel for a time duration in accordance with the value of the picture-signal for that pixel.

Preferably, a pixel is actuated for a time period corresponding to the interval between the reception, at the pixel, of a specified characteristic in the picture-signal and the occurrence of that specified characteristic in a reference signal.

Preferably, a counter is monitored for the presence of a specified characteristic in an input signal, and setting the associated pixels to a state upon detection of the specified characteristic.

Preferably in the invention, a pixel comprises one or more liquid crystal cells.

The invention is applicable to colour displays and to monochrome displays.

The present invention also embodies equipment for the generation, and/or transmission, and/or reception, and/or processing, of signals suited and/or designed for a display device as herein defined.

BRIEF DESCRIPTION OF THE DRAWINGS

In order that the invention may more readily be understood, a description is now given, by way of example only, reference being made to the accompanying drawings, in which.

DESCRIPTION OF THE PREFERRED EMBODIMENTS

Figure 1:
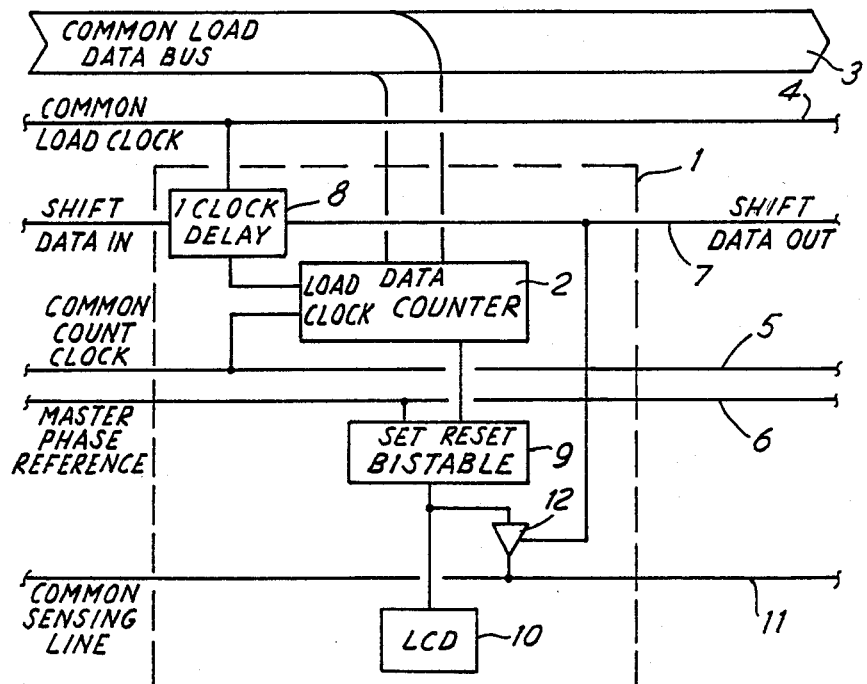
FIG. 1 is a circuit diagram of a pixel within a display device embodying the present invention.

In the pixel 1 of FIG. 1, a continuously clocked counter 2 is used both as the data store and as the mechanism of grey scale generation, in order to minimize circuit size and complexity. Because the counter 2 is continuously clocked, it can use dynamic circuitry which takes up less silicon area. The grey level of each pixel 1 is stored as the phase of the counter 2 (i.e. the phase of the counter's most significant bit) with respect to a reference count. The phase is controlled by loading each counter with a value representing the grey level, as the television signal is received. If each bistable pixel 1 passes light for the time difference between its counter's phase and the reference phase, the result is a grey level display as required.

The data bus 3, load clock 4, counter clock 5 and master phase reference 6 are all lines which transport signals common to a large number of pixels; therefore although they must be buffered at some point in the circuit, that might only be every 50 elements, so that the only space taken up by these signals is in interconnections.

The shift data line 7 is used to propagate a bit which enables the counter load input. In effect each pixel circuit instructs the adjacent circuit that it is next to be loaded, by use of a clock delay 8. Thus pixels are loaded in sequence from data on the load bus 3, that data being changed between load clock pulses. The bistable circuit element 9, set from the master timing and reset from the counter, has an output which directly drives a bistable liquid crystal display device 10.

Figure 2:
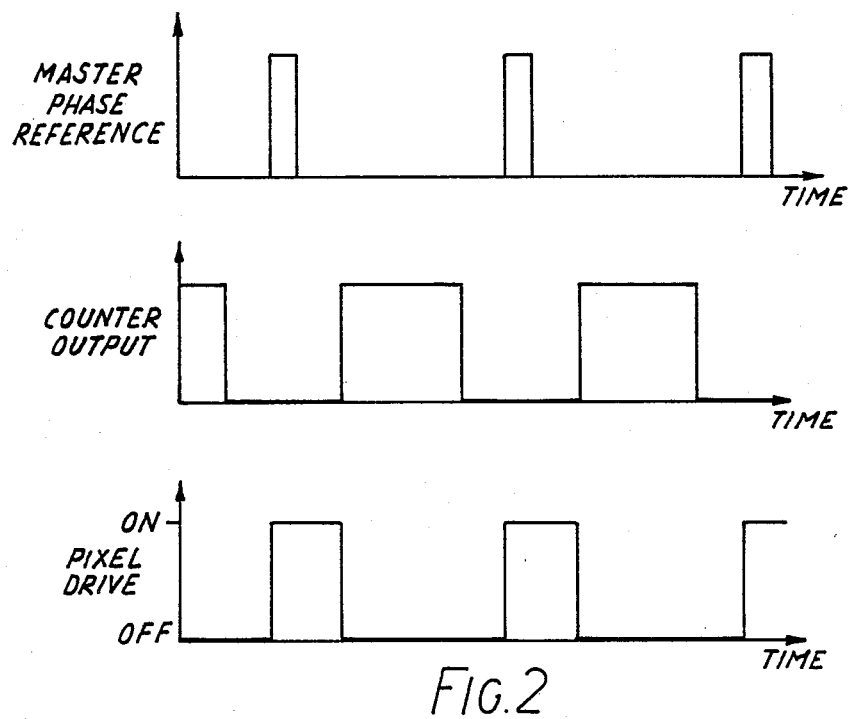
FIG. 2 is a representation of the waveforms of the circuit of FIG. 1.

FIG. 2 shows some timing waveforms to go with FIG. 1. The counter clock and the load clock have been drawn separately in FIG. 1 to emphasise that there is no relationship between them. Indeed, if the data input is halted completely, the counters would continue clocking indefinitely, displaying the grey scale image that is stored as phase information. In practice the load clock is determined by the picture input rate, while the counter clock is arranged so that the counter recycles above the flicker fusion frequency, for instance, the counter might cycle twice per television field.

A common sensing line 11 is fed from a tristate driver 12 at each pixel, the tristate driver 12 being active at whichever pixel was last loaded with data. This allows the counter phase to be monitored remotely, which is a check on the operation of the total circuit at that pixel. By continuing to monitor the sensing line, while loading successive counters with data, the operation of each pixel circuit may be checked in turn.

In one arrangement, a counter 2 has one stage more than the number of data bits e.g. for a 4-bit word giving 16 grey levels, the bits are loaded into the four least significant stages of a 5 stage counter. A similar counter is used to generate the master phase reference which sets the bi-stable each time the MSB changes, namely every 16 counter clock pulses. If a pixel counter is loaded with a value N and counted down, the M.S.B. changes after N, N+16, N+32 (and so on) clock pulses and re-sets the bi-stable. Therefore if the counter is loaded when the master counter is in a reference phase (for example immediately after the MSB has changed state and set the bi-stable), the bi-stable remains in the set for N clock periods. It is necessary for all the counters using the same master reference phase to be loaded during one period of the counter clock as well as at a specific phase of the master counter.

Figure 3:
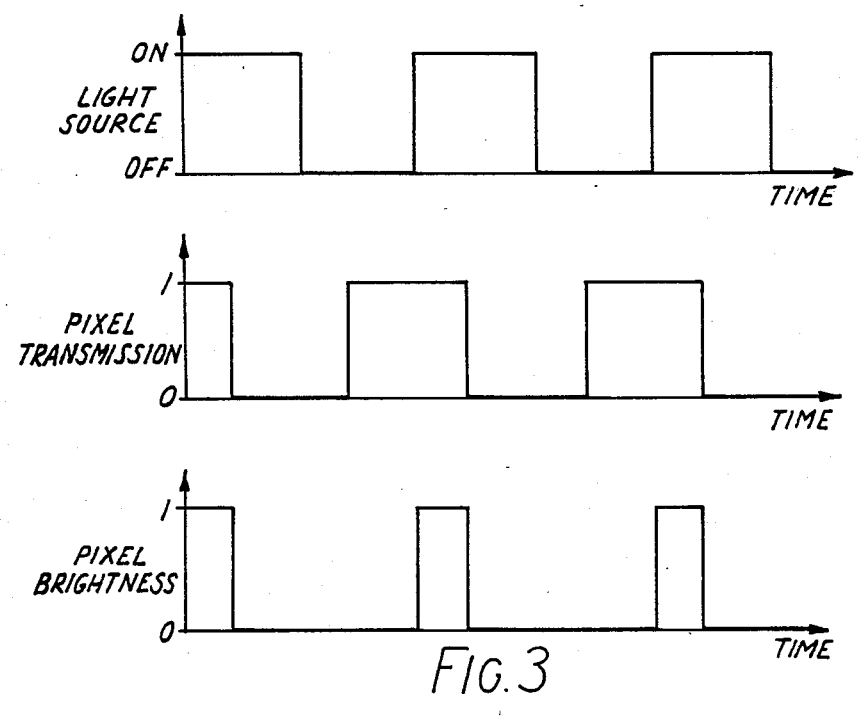
FIG. 3 is a representation of the waveforms for a modified circuit diagram.

In a modification, instead of an electronic gating signal as in FIG. 1, the pixel 1 is driven directly by the square wave from the counter output, while the gating is performed by switching on and off the light source. FIG. 3 shows timing diagrams for this arrangement. One advantage is that, as long as the image is static, each pixel 1 is switched on and off for equal times, so has no opportunity to build up a memory of the grey level state it is in. A second advantage is that, if the light source can be switched sequentially to red, green, and blue, a colour display can be produced without the need for separate pixels. It is necessary to have separate counters for the red, green, and blue components, so as to control each pixel sequentially, in synchronism with the changes in the light source.

Figure 4:
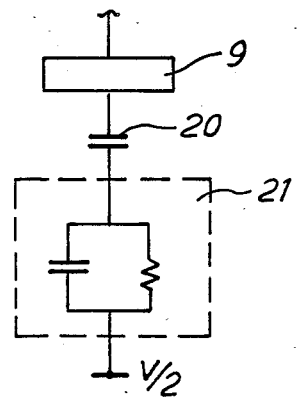
FIG. 4 is a circuit diagram of part of a pixel within a ferroelectric liquid crystal display embodying the present invention.
Figure 5:
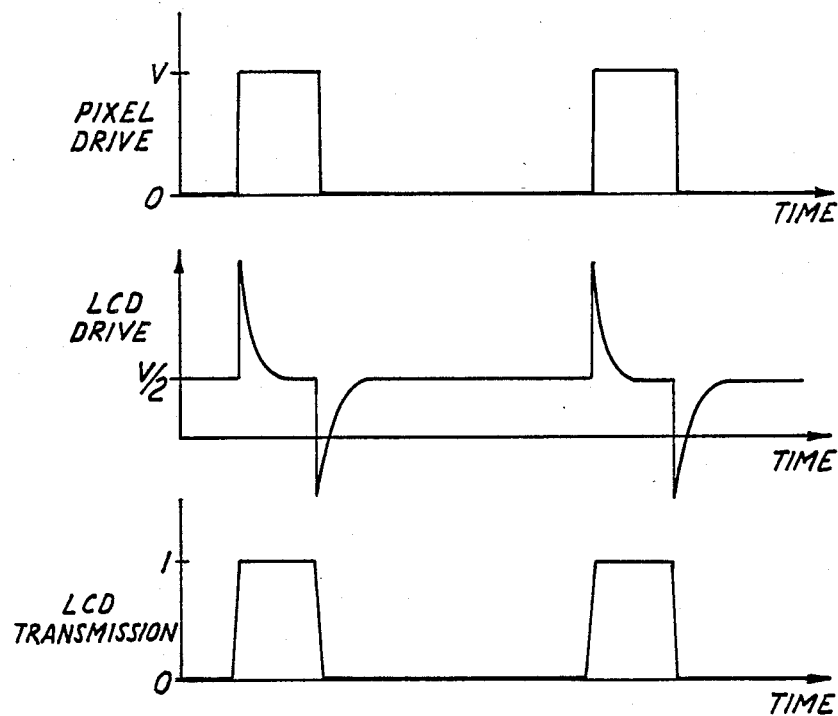
FIG. 5 is a representation of the waveforms of FIG. 4.

The pixel drive voltage depends on the display material used, as does the optimum waveform to be used for driving. For instance, if the LCD is of ferroelectric material, the waveform of FIG. 2 is not directly suitable, since it contains a d.c. component. One solution is to a.c. couple the signal by depositing a thin insulating layer on the display plate to act as a capacitor 20 in series with each ferroelectric liquid crystal device 21 (see FIG. 4). The pixel is then switched by the edge spikes of the waveform, assuming that it has a low enough internal resistance to charge up the series capacitor between edges. FIG. 5 shows the waveforms for this arrangement.

In another modification, suitable for driving twisted nematic, guest-host, or similar liquid crystal, the back electrode of each pixel is driven directly by the most significant bit of the counter, while the front electrode is driven by the reference square wave. The reference square wave has the same frequency as the counter output, but not necessarily the same phase, while its amplitude may be the same or somewhat greater than the amplitude of the counter output. If all the pixels in the image have the same reference square wave, the front of the screen may conveniently be driven as a single electrode.

Figure 6:
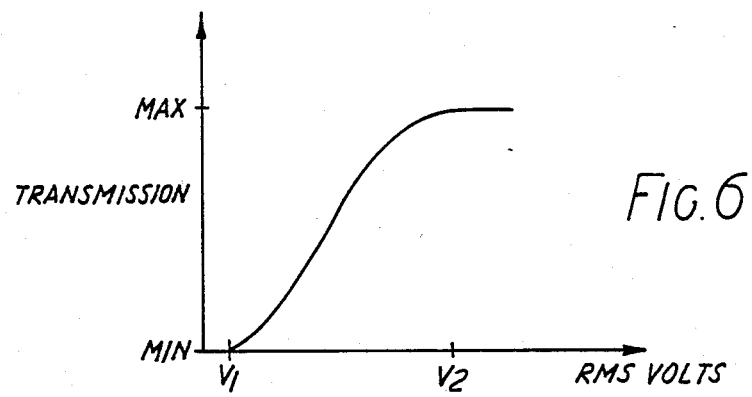
FIG. 6 is a graph of transmission against r.m.s. applied voltage for another form of liquid crystal display.
Figure 7:
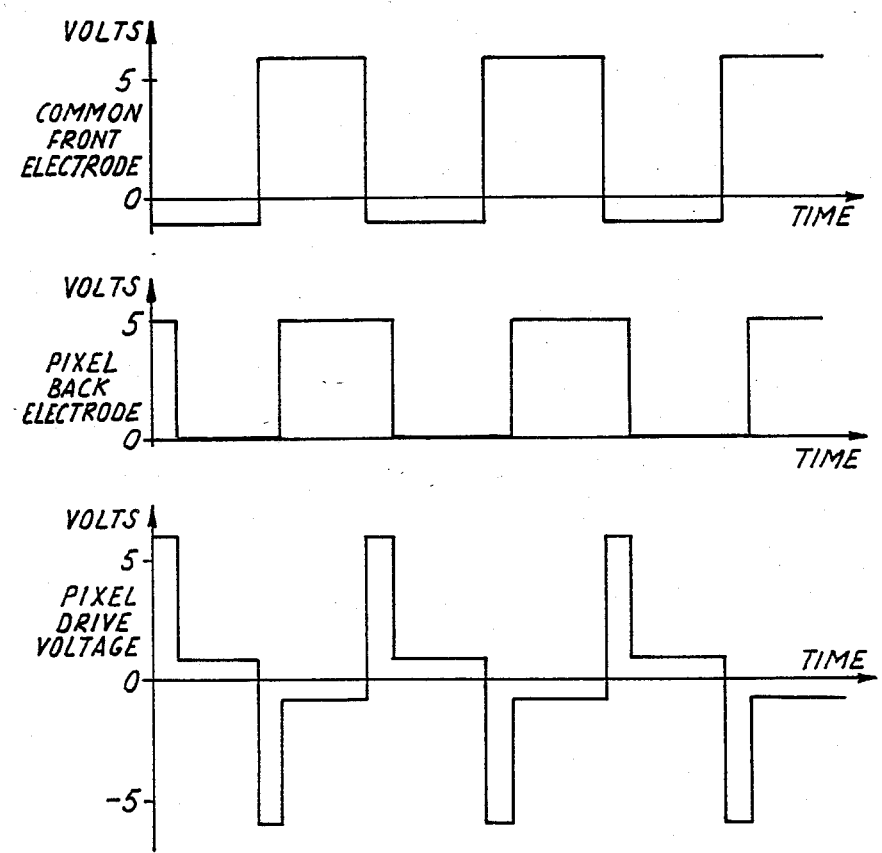
FIG. 7 is a representation of the waveforms for the display of FIG. 6.

FIG. 6 shows schematically the transmission of a guest-host liquid crystal cell as a function of the rms applied voltage. RMS voltages between V1 and V2 are needed to control the cell brightness. FIG. 7 shows an example of the voltages applied to the electrodes of one LCD pixel according to the invention, together with the voltage across the pixel. As the phase of the back electrode drive is altered the RMS drive across the pixel can in this case be varied between 1 and 6 volts.

In general, if the back electrode square wave is Vb volts rms (2Vb peak to peak) and the front electrode square wave is Vf volts rms, then by varying the phase of the back electrode drive the rms voltage across the cell can be controlled between (Vf−Vb) and (Vf+Vb).

I claim:

1. A display device for displaying a picture represented by picture-signals, the display device comprising:
    a lattice of pixels for displaying the picture;
    an associated counter for each pixel, each associated counter being operable for continuous counting; and
    means to operate each associated counter to effect actuation of each pixel for a time period dependent upon at least the value of the picture-signal for that pixel.

2. A display device according to claim 1 wherein the display device has means to input the picture-signal for a pixel to that pixel in order to set that pixel to a state.

3. A display device according to claim 1, the picture signal for a pixel having a detectable characteristic, the display device also comprising means for producing and applying a reference signal to each pixel, the reference signal having another detectable characteristic such that an interval of time between the reception at a pixel of said detectable characteristic and the reception of said another detectable characteristic can be determined wherein the time period for said pixel corresponds to said interval of time.

4. A display device according to claim 1, the picture signal for a pixel having a detectable characteristic, wherein an associated counter has means to monitor for the presence of said detectable characteristic and means to set said pixel to a state upon detection of said detectable characteristic.

5. A display device according to claim 1, 2, 3 or 4 wherein liquid crystal cells form the lattice.

6. A method of operating a display device to display a picture represented by picture signals, the display device comprising a lattice of pixels for displaying the picture and an associated counter for each pixel, each associated counter being operable for continuous counting, the method comprising operating each associated counter to effect actuation of each pixel for a time period dependent upon at least the value of the picture-signal for that pixel.

7. A method according to claim 6, the picture signal for a pixel having a detectable characteristic, the method further comprising the steps of producing a reference signal having another detectable characteristic and of applying the reference signal to a pixel wherein the interval of time between the reception at a pixel of said detectable characteristic and the reception of said another detectable characteristic can be determined and the time period for said pixel corresponds to said interval of time.

8. A method according to claim 6, the picture signal for a pixel having a detectable characteristic wherein an associated counter monitors for the presence of said detectable characteristic and sets said pixel to a state upon detection of said detectable characteristic.

9. A method according to claim 6, comprising inputting the picture-signal for a pixel to that pixel in order to set that pixel to a state.

10. A display device for displaying a picture represented by a picture signal, the display device comprising:

a lattice of pixels for displaying the picture;
an associated counter for each pixel, each associated counter being operable for continuous counting;
and means to operate each associated counter to effect actuation of each pixel at a brightness level for the picture dependent upon at least the value of the picture-signal for that pixel.

11. A display device according to claim 10, the picture signal for a pixel having a detectable characteristic, the display device also comprising means for producing and applying a reference signal to each pixel, the reference signal having another detectable characteristic such that an interval of time between the reception at a pixel of said detectable characteristic and the reception of said another detectable characteristic can be determined wherein the brightness level of a pixel is determined by said interval of time.

12. A method of operating a display device to display a picture represented by picture-signals, the display device comprising a lattice of pixels for displaying a picture and an associated counter for each pixel each associated counter being operable for continuous counting, the method comprising operating each counter to effect actuation of each pixel at a brightness level for the picture dependent upon at least the value of the picture-signal for that pixel.

13. A method according to claim 12, the picture signal for a pixel having a detectable characteristic, the method further comprising the steps of producing a reference signal having another detectable characteristic and of applying the reference signal to a pixel wherein the interval of time between the reception at a pixel of said detectable characteristic and the reception of said another detectable characteristic can be determined and said brightness level is determined by said interval of time.

* * * * *